E. H. VINING.
Grinding Mill.
No. 100,824.
Patented March 15, 1870.
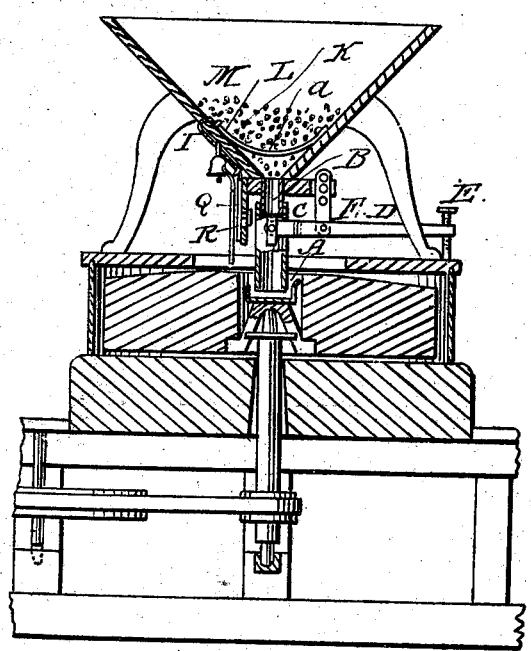
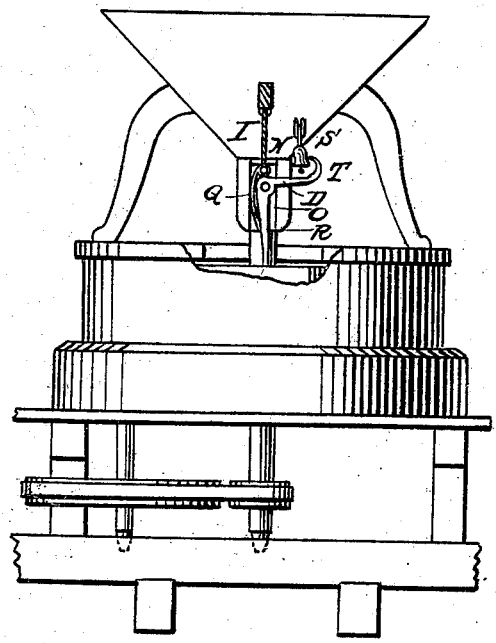
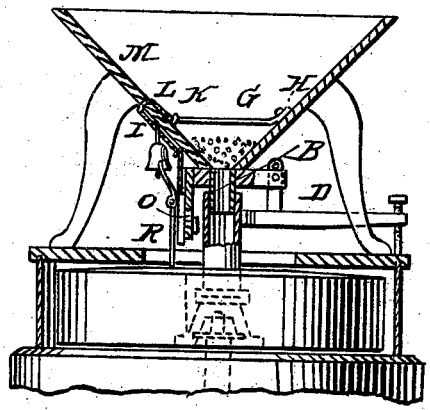

United States Patent Office.

ELIJAH H. VINING, OF COVINGTON, GEORGIA.

Letters Patent No. 100,824, dated March 15, 1870.

IMPROVEMENT IN GRINDING-MILLS.

The Schedule referred to in these Letters Patent and making part of the same.

To all whom it may concern:

Be it known that I, ELIJAH H. VINING, of Covington, in the county of Newton, and State of Georgia, have invented a new and useful Improvement in Grinding-Mills; and I do hereby declare that the following is a full, clear, and exact description thereof, which will enable others skilled in the art to make and use the same, reference being had to the accompanying drawings forming part of this specification.

The invention relates to an improved alarm apparatus for warning the miller when the grain is nearly out of the hopper, and consists in the combination with a strap of leather or other flexible substance traversing the bottom of the hopper, to be pressed down by the weight of the grain when the hopper is full, of a slide, bell-clapper, and bell, held out of action when the strap is covered with grain by the said strap, but let fall when the grain passes off the strap, so that the bell-clapper will come in contact with the stone, and be agitated by it so as to strike the bell and give the alarm.

Figure 1 represents a sectional elevation of the improved mill, taken on the line x x of fig. 2, showing the position when the bell-clapper is held above the stone;

Figure 2 is a side elevation of the same; and

Figure 3 represents a sectional elevation through the hopper, also through the line x x, but showing the position when the alarm is being sounded.

A is the cup on the top of the balance iron.

B, the tube connected to the hopper, and through which the grain passes.

C is the tube having a telescopic connection, B. It extends into the cup A below the top, and is provided with a lever, D, and adjusting-screw E, for raising and lowering it.

The lever is crotched at its short end, and jointed to the tube, and has a fulcrum at F, suspended from the hopper, or in any other suitable way.

The grain settles down through these tubes B C into the cup A, from which it is caused to be discharged by centrifugal force over the top of the cup at all points alike, thus supplying it to the stones in the same equal way.

The raising or lowering of the tube C will allow the grain to flow over the top of the cups more or less rapidly, as required.

G represents a strap of leather, cloth, or other similar substance, permanently connected to the inside of the hopper, at H. A cord, I, is tied to the other end, and passes under a staple, K, and through a small hole, L, above, in the side of the hopper M. This cord is guided along down the hopper in guides N, and is connected to a vertical slide, O, working in any suitable guides on the hopper, and carrying a bell-cranked hammer, P, and a spring, Q, bearing against it.

The bell-hammer is pivoted to the slide, and has a pendent arm, R, reaching very nearly to the top of the running stone when the slide is up, and quite down to the edge of the eye when the slide is down.

S is a bell, hung from the hopper so that the arm T of the hammer is borne against it by the spring Q.

When the grain in the hopper rests on the strap G, it will be pressed down, and will draw up the slide O and arm R of the hammer away from the stone, but when it is nearly out and falls below the strap, the weight of the hammer and slide will carry them down, so that the end of R, touching the running stone, will be moved thereby against the spring, which, when sufficiently strained, will throw the hammer back so as to strike the bell, when, coming again in contact with the stone, it will again go forward against the spring, and so on, an alarm will be kept up as long as there is no grain in the hopper and the stone runs.

Having thus described my invention,

What I claim as new, and desire to secure by Letters Patent, is—

The combination with the hopper and running stone of the strap G, cord I, slide O, bell-hammer P, spring and bell, substantially as specified.

E. H. VINING

Witnesses:
O. S. PORTER,
GILES S. WHITTEN.